(12) United States Patent
Michaelsen et al.

(10) Patent No.: US 7,113,567 B2
(45) Date of Patent: Sep. 26, 2006

(54) APPARATUS AND METHOD FOR THE ANALYSIS OF ATOMIC AND MOLECULAR ELEMENTS BY WAVELENGTH DISPERSIVE X-RAY SPECTROMETRIC DEVICES

(75) Inventors: Carsten Michaelsen, Geesthacht (DE); Rüdiger Bormann, Rosengarten (DE); Jörg Wiesmann, Lüneburg (DE)

(73) Assignee: GKSS Forschungszentrum Geesthacht, Geesthacht (DE)

( * ) Notice: Subject to any disclaimer, the term of this patent is extended or adjusted under 35 U.S.C. 154(b) by 0 days.

(21) Appl. No.: 10/196,805

(22) Filed: Jul. 17, 2002

(65) Prior Publication Data
US 2004/0013227 A1    Jan. 22, 2004

(30) Foreign Application Priority Data
Jul. 18, 2001    (DE) .................. 101 34 266

(51) Int. Cl.
G21K 1/06      (2006.01)
G01N 23/223    (2006.01)
G01T 1/36      (2006.01)

(52) U.S. Cl. .............................. 378/85; 378/44; 378/84

(58) Field of Classification Search ................. 378/84, 378/85
See application file for complete search history.

(56) References Cited

U.S. PATENT DOCUMENTS 4,675,889 A * 6/1987 Wood et al. .................. 378/84

* cited by examiner

Primary Examiner—Edward J. Glick
Assistant Examiner—Krystyna Suchecki
(74) Attorney, Agent, or Firm—Klaus J. Bach

(57) ABSTRACT

In an apparatus and a method for the analysis of atomic or molecular elements contained in a sample by wavelength dispersive X-ray spectrometry, wherein primary x ray or electron radiation is directed onto the sample whereby fluorescence radiation is emitted from the sample, the fluorescence radiation is directed onto a mirror or focussing device consisting of a multi-layer structure including pairs of layers of which one layer of a pair comprises carbon or scandium and the other comprises a metal oxide or a metal nitride and the fluorescence radiation is reflected from the mirror or focussing device onto an analysis detector for the analysis of the atomic or molecular elements contained in the sample.

8 Claims, 1 Drawing Sheet

APPARATUS AND METHOD FOR THE ANALYSIS OF ATOMIC AND MOLECULAR ELEMENTS BY WAVELENGTH DISPERSIVE X-RAY SPECTROMETRIC DEVICES

BACKGROUND OF THE INVENTION

The invention relates to an apparatus for the analysis of atomic and/or molecular elements by wavelength dispersive X-ray spectrometric devices comprising at least one reflection—or focussing device including a multi-layer structure, particularly an apparatus wherein fluorescence rays generated by a sample to be analyzed when subjected to incident primary X-ray or electron radiation are directed onto a mirror or focussing device before reaching a measuring or analysis detector. The mirror or focussing device is formed by a multi-layer structure comprising layer pairs each including a first layer element formed by carbon or scandium. The invention also resides in an analysis method employing such apparatus.

Apparatus and methods of this type are known for example from DE OS 199 26 056. They are used in scientific analyses but also in industrial applications for the detection of atomic and/or molecular elements in various areas for example when impurities or disturbances present in examples in only small amounts are to be detected or analyzed.

In that case, X-ray or electron beams from any type of X-ray or electron source are directed onto a sample whereby, among others, fluorescence rays are returned from the sample which are induced by the incident X-rays by a well-known physical processes. These fluorescence rays are directed onto a suitable crystal where they are reflected and then directed onto a measuring and analysis arrangement for example in the form of a fluorescence radiation-selective detector. The crystals act as analyzers. These crystals which can be artificial crystals may consist of thin multiple alternate layers of two or more materials with different X-ray optical properties. In connection with the above example, the incident fluorescent rays are reflected from these layers but only that part of the fluorescent rays for which the Bragg equation.

$$n\lambda = 2d \sin \theta$$

is fulfilled,

Herein:

$$\lambda(\text{nm}) = 1.24/E(\text{keV})$$

wherein n is a natural number (n=1, 2, 3, 4 . . . )
$\lambda$=the wavelength of the x rays, that is,
d=the periodicity (lattice parameter) of the analyzer crystal,
$2\theta$=infraction angle, and
E=energy of the X-rays.

Taking into consideration the effect of the refraction, which is very small for X-rays, results in an equation which is modified from the first equation whereby from the set angles $\theta$ and the lattice parameter d of the analyzer the wavelength of the reflected X-rays can be determined from the first equation or the modification thereof. By varying the angle therefore the wavelength of the reflected rays, that is in the above example the fluorescence rays, can be selected in a controlled manner.

The big advantage of the artificial crystals which consist of regularly changing layers—called in this connection also multi-layer—is that the materials of which the multi-layer consists can be selected and optimized for best results. This is an essential advantage of the manufactured multi-layer as compared to natural crystals.

The intensity of the reflected radiation depends greatly on the materials used for the multi-layer. In addition, the lattice parameters of the multi-layer can be modified within a larger range than it is possible with natural crystals.

It is a particular advantage of the multi-layer analyzer that it facilitates the analysis of light elements with uniform intensity and without health-endangering side effects.

In many cases so far the multi-layer structure or, respectively, the individual layers of the multi-layer structure, have been adapted specifically to the element expected to be analyzed. X-ray fluorescence spectrometers have generally the problem that their effectiveness in the soft X-ray range is insufficient for many examinations. So far multi-layer structures have been used wherein a layer element of a multi-layer pair consisted of vanadium and the other layer element consisted of carbon or wherein the first layer element consisted of iron and the second layer element consisted of scandium. It has been found however, that, with the known multi-layer structures, the yield and the efficiency of X-ray fluorescence spectrometers are very low in the said soft X-ray range. For the scientific and the commercial utilization of the X-ray spectrometers even a small increase of the reflectivity of the multi-layer structure may be essential and commercially of greatest importance.

Another disadvantage of the known X-ray fluorescence spectrometers or, respectively, the multi-layer structures, which are used in this connection, resides in the fact that the known multi-layer structures for the soft X-ray range have a high tendency to interdiffusion and that they are therefore not stable. They are furthermore difficult to manufacture.

It is therefore the object of the present invention to provide an apparatus and method by which the X-ray analysis for detecting carbon and nitrogen can be substantially improved wherein the apparatus and the method can be operated with means essentially known so that conventional analysis apparatus and methods can be utilized essentially unchanged so that relatively little expenses occur with use of the apparatus and method according to the invention.

SUMMARY OF THE INVENTION

In an apparatus and a method for the analysis of atomic or molecular elements contained in a sample by wavelength dispersive X-ray spectrometry, wherein primary x-rays or electron radiation is directed onto the sample whereby fluorescence radiation is emitted from the sample, the fluorescence radiation is directed onto a mirror or focussing consisting of a multi-layer structure including pairs of layers of which one layer of the pair comprises carbon or scandium and the other comprises a metal oxide or a metal nitride from which mirror or focussing device the fluorescence radiation is reflected onto an analysis detector for the analysis of the atomic or molecular elements contained in the sample.

The advantage of the solution according to the invention resides essentially in the fact that the reflectivity of the multi-layer mirror or, generally, multi-layer structure with regard to the soft X-ray radiation is significantly increased which had not been considered to be possible. The actual increase in reflectivity achieved by the present invention is surprising to the persons skilled in the art and, based on the understanding of the persons skilled in the art, is actually a contradiction of what was predicted. A scientific explanation for the significant increase of the reflectivity achieved by the invention may be based on effects caused by the absorption edges and the abnormal dispersion of the materials used in accordance with the invention.

Another essential advantage of the arrangement and method according to the invention results from the examination procedure with the multi-layer structure according to the invention since it results in small reflexes and in a significantly improved resolution and signal to background ratio. Particularly for the detection of carbon, it has been found to be very advantageous to form the metal oxide of the second layer pair by titanium oxide. Such multi-layer mirrors have a good thermal stability and can be more easily made in comparison with conventional multi-layer structures.

It has been found to be advantageous particularly for the detection of nitrogen if the metal oxide of the second element of the layer pair is formed by vanadium oxide whereby also in this case a much improved stability is achieved when compared with known multi-layer structures for the detection of nitrogen. The structure is also easier to manufacture than multilayer mirrors made in the conventional way.

The metal nitride of the second element of the layer pair can, in accordance with another advantageous embodiment of the method, be formed by titanium-nitride or vanadium nitride wherein the titanium-nitride and vanadium nitride may replace titanium oxide and, respectively, vanadium oxide as the second layer element, depending on the application.

In accordance with another advantageous embodiment, a layer may be disposed between the layer elements of the layer pair, which prevents a reaction between the layer elements forming the layer pair. At the interfaces between the carbon or, respectively, the scandium and the metal oxide or, respectively, the metal nitride, the layers of the multi-layer mirror may react with each other whereby the multi-layer mirror formed thereby may become useless. With this reaction-preventing layer, which consists preferably of tungsten, the undesirable reaction of the adjacent multi-layer structures or layer elements of a multi-layer pair can be eliminated.

Preferably, the multi-layer structure comprises 1 to 100 layer pairs that is 2 to 200 individual layers. The number of layers or layer pairs which are selected for the formation of a certain multi-layer structure depends essentially on the intended analysis or measuring task and the type and amount of impurities expected to be present in the sample to be examined.

It is particularly advantageous if the multi-layer structure comprises 40–50 layer pairs that is 80 to 100 layers.

In a basic version of the apparatus, the thickness of the respective multi-layer structure is constant. However, it is also possible that the thickness of one layer of each multi-layer pair is different from the other layer of the multi-layer pair.

Basically, it is made sure in the embodiment described above that a parallel fluorescence beam is reflected at the complete surface of the multi-layer structure with maximum intensity.

In another advantageous embodiment, the thickness of the respective multi-layer varies over its extent whereby it is ensured that non-parallel fluorescence rays reaching the multi-layer structure under different incident angles are reflected for the desired wavelength over the full surface of the multi-layer structure with maximum intensity. The different incident angles $\theta$ are compensated for in accordance with the equation given earlier or the corrected modification thereof by a variation of the lattice parameter d, so that $\lambda$ remains constant.

Preferably, the apparatus is so modified that the multi-layer is curved or, in another advantageous embodiment, the multi-layer structure is disposed on a support surface (substrate). This however is possible in connection with all embodiments of the multi-layer structure. In this way, it is ensured that a nonparallel fluorescence beam which reaches the multi-layer structure at different points under different incident angles, can be influenced so that for example a divergent fluorescence beam can be converted into a parallel or a focussed fluorescence beam. It may also be advantageous if the thicknesses of the individual layers of the multi-layer structure are different, that is, if their thicknesses vary in a suitable manner so that the multi-layer structure reflects the fluorescence radiation of the desired wavelength which reaches the multi-layer structure under different angles with maximum intensity over the whole area.

The multi-layer structure may comprise a combination wherein one of the layers of the multi-layer pair has a uniform thickness whereas the other layer has a varying thickness.

Preferably, the layer thickness is in the area of 1 to 20 nm. Examinations have revealed that with such layer thicknesses the highest reflectivity and the best resolution of the multi-layer structure can be achieved.

The method for the analysis of atomic and/or molecular elements by means of wavelength dispersive X-ray spectrometric apparatus comprising at least one mirror or focussing arrangement including a multi-layer structure onto which the primary X-ray or electron radiation is directed, wherein particularly fluorescence radiation induced by the incident primary X-ray and electron radiation is directed onto the mirror or focussing arrangement before the radiation is directed onto a measuring or analyzing detector and wherein the mirror or focussing arrangement includes at least one layer pair of a multi-layer structure and a first layer of the layer pair consists of carbon or scandium, the second layer of the layer pair consists of a metal oxide or a metal nitride.

With the method according to the invention, a reflectivity of over 51% and, respectively, 48% can be achieved in the first Bragg order for the carbon and, respectively, nitrogen line at 277 and, respectively, 392 eV. This value significantly exceeds the values achievable with the best presently known methods wherein multi-layer structures are used as analyzers.

TABLE 1

Reflectivity of various layer pairs for the carbon line k with the parameters pair layer thickness d = 6 nm, 100 pairs, roughness = 0, layer thickness ratio = 1 − d carbon/d = 0.4.

| Material | Reflectivity at 277 eV (%) |
|---|---|
| V—C | 41.3 |
| VC—C | 40.6 |
| VN—C | 48.7 |
| VO—C | 48.5 |
| Ti—C | 39.2 |
| TiC—C | 39.8 |
| TiN—C | 49.4 |
| $TiO_2$—C | 51.2 |

TABLE 2

Reflectivities of various layer pairs for the nitrogen line with the parameters: pair layer thickness d = 5.5 nm, 100 pairs; roughness = 0, layer thickness ratio = 1 − d scandium/d = 0.4

| Material | Reflectivity at 392 eV (%) |
|---|---|
| Fe—Sc | 45.5 |
| VN—Sc | 45.8 |
| VO—Sc | 48.8 |
| TiN—Sc | 40.8 |
| $TiO_2$—Sc | 47.2 |

Generally, the method according to the invention has the same advantages as they have been described for the apparatus according to the invention. Reference is therefore made to the advantages given earlier for the apparatus.

The invention will now be described for a particular embodiment with reference to the attached schematic drawings.

DESCRIPTION OF A PARTICULAR EMBODIMENT

Figure 1:
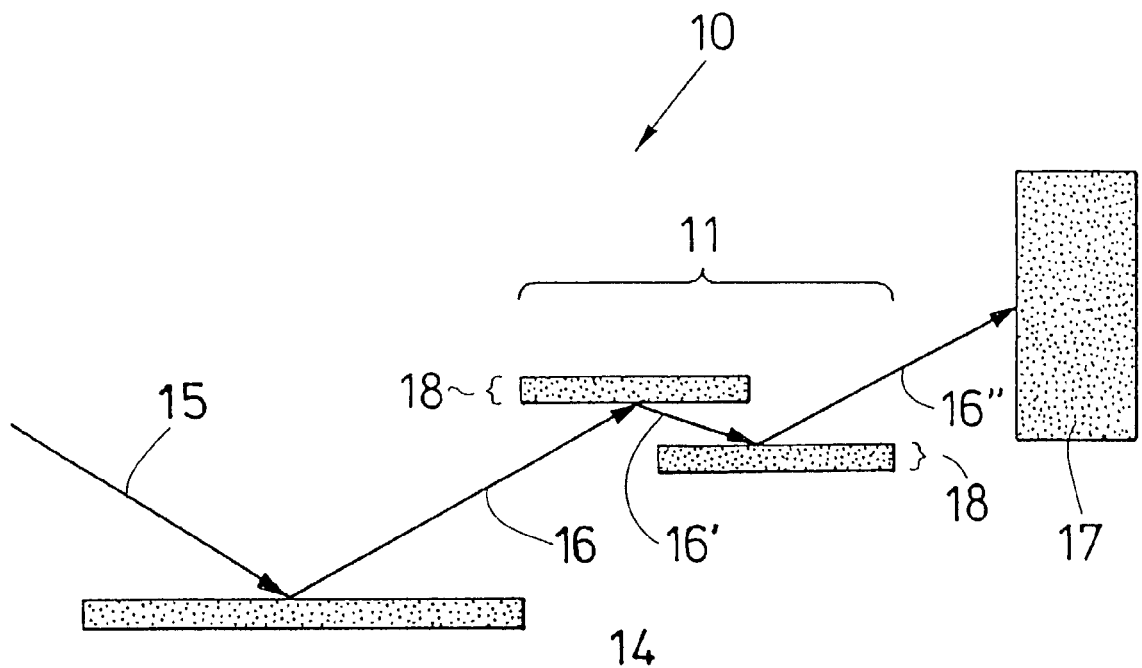
FIG. 1 shows radiation from an X-ray source reaching a sample from which it is reflected onto a multi-layer mirror and then onto a measuring or analysis apparatus (detector) and FIG. 2 shows incident rays (in the example fluorescence radiation) reaching the multi-layer structure of the apparatus according to the invention, which is disposed on a substrate.

First reference is made to FIG. 1, which schematically shows an apparatus for the analysis of atomic and/or molecular elements in accordance with the invention as it may be used with some variations for many applications.

From an X-ray or electron source, which is not shown in the figure, primary X-rays at electron rays 15 are emitted and are directed onto a sample 14 for example in the form of a silicon wafer for detecting impurities in the silicon wafer on or near the surface thereof. Because of well-known physical phenomena, fluorescence rays are generated as reflected rays, which include information concerning the type of additional atomic and/or molecular elements contained in the sample 14. The fluorescence rays 16 are directed onto a mirror or focussing device 11, which in the example of FIG. 1 consists of two mirror or focussing devices 11 formed each by a multi-layer structure 12. In another embodiment of the apparatus 10, the focussing device consists only of a mirror or of a focussing structure. The fluorescence rays 16' or 16" reflected from the mirror or focussing device are directed onto a measuring or analysis arrangement (detector) 17 by means of which, in a known manner, quantitative and qualitative information concerning the type of the atomic and/or molecular elements present on, or in the material of, the sample 14 can be obtained.

Figure 2:
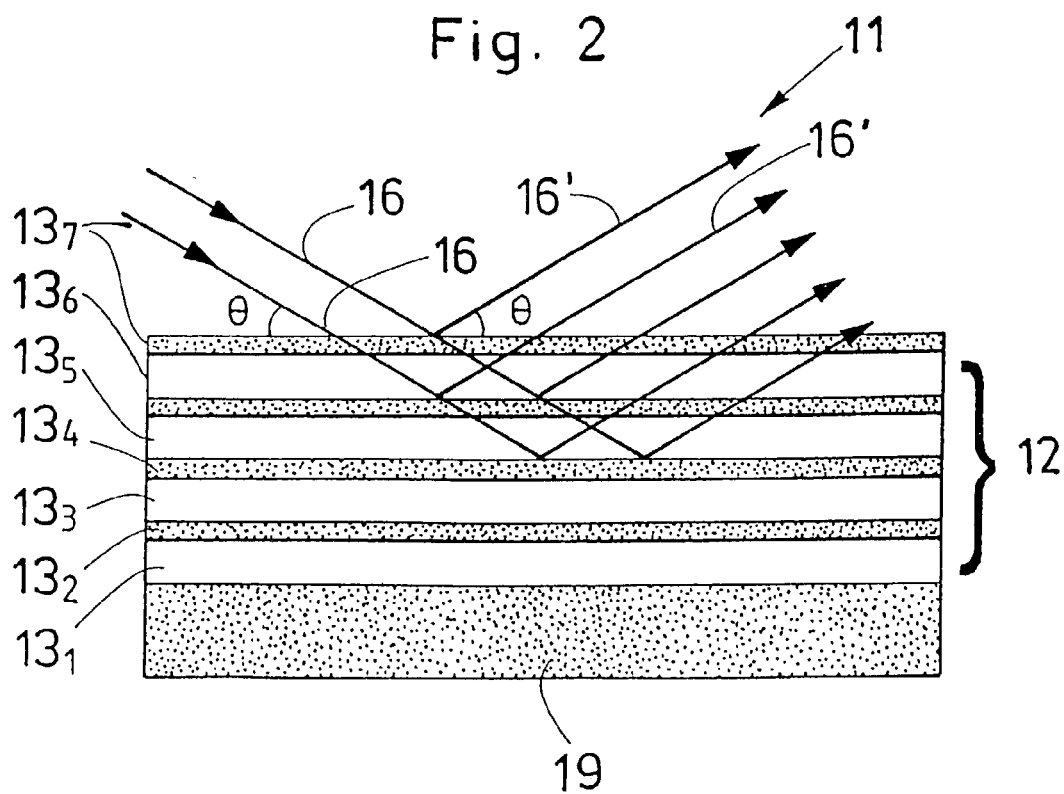

FIG. 2 shows a section of the mirror and focussing device 11, which represents the actual multi-layer structure 12 disposed in this case on a substrate 19.

The individual layers $13_1 \ldots 13_n$ form with the plurality of all the pairs $13_1, 13_2; 13_3, 13_4; 13_5, 13_6$ etc. the complete multi-layer structure 12. The layers of each layer pair consist of a carbon layer or a scandium layer (first layer element) and a metal oxide layer or a metal nitride layer (second layer element). The incident rays or beam, in the example fluorescence rays 16, are reflected at the interfaces of the different layer pairs and the reflected rays or beams 16' leaving the mirror or focussing structure 11 are directed onto a second mirror or focussing structure 11, see FIG. 1. Reflected from there, they reach the measuring or analysis device 17 or they reach the measuring an analysis device 17 directly without being reflected from a second mirror or focussing structure 11.

What is claimed is:

1. An apparatus for the analysis of atomic and molecular elements by wavelengths dispersive X-ray spectrometric devices comprising a mirror or focusing structure including a multi-layer structure onto which fluorescence rays emanating from a sample to be tested by exposure to primary X-ray or electron radiation, which is directed onto said sample, are directed and from which they are reflected, and a measuring or analysis detector onto which said reflected fluorescence rays are directed for the analysis of the atomic and molecular elements in said sample, said multilayer structure comprising at least one pair of layer elements of which a first layer element of the pair is formed by one of carbon and scandium and the second is formed by one of a titanium oxide, vanadium oxide, titanium nitride and vanadium nitride.

2. An apparatus according to claim 1, wherein a protective separation layer is disposed between said first and second layer elements, which prevents reactions between the first and second layer elements.

3. An apparatus according to claim 2, wherein said reaction preventing separation layer consists of tungsten.

4. An apparatus according to claim 1, wherein a layer pair has a thickness of 1 to 20 nm.

5. An apparatus according to claim 4, wherein a layer pair has a thickness of about 6 nm.

6. An apparatus according to claim 1, wherein said multilayer structure includes 1–100 layer pairs.

7. An apparatus according to claim 6, wherein said multi-layer structure includes 40–50 layer pairs.

8. A method of analyzing atomic and molecular elements by a wavelength dispersive X-ray spectrometric device comprising a mirror or focusing structure including a multi-layer consisting of a plurality of layer pairs and a measuring and analysis detector, said method comprising the steps of directing a primary X-ray or electron beam onto a sample to be tested to induce fluorescence radiation which is then emitted therefrom, directing said fluorescence radiation onto said mirror or focusing structure at an angle such that said fluorescence radiation is reflected therefrom by at least one layer pair of said multi-layer structure of which one layer consists of one of carbon and scandium and the other of one of titanium oxide, vanadium oxide titanium nitride and vanadium nitride, onto a detector for the analysis of the sample.

* * * * *